United States Patent [19]
Laudan et al.

[11] Patent Number: 5,220,710
[45] Date of Patent: Jun. 22, 1993

[54] CABLE CLAMP

[75] Inventors: Charles J. Laudan, San Bernardino; James W. Stark, Burbank; Michael Welliver, Los Angeles, all of Calif.

[73] Assignee: TA Mfg. Co., Glendale, Calif.

[21] Appl. No.: 745,448

[22] Filed: Aug. 15, 1991

[51] Int. Cl.⁵ .............................................. F16L 3/00
[52] U.S. Cl. .................... 24/279; 24/20 LS; 24/282; 285/373
[58] Field of Search .................. 24/279, 278, 282, 205, 24/20 LS, 20 EE, 23 EE; 285/373, 253; 248/74.1

[56]      References Cited
       U.S. PATENT DOCUMENTS

| | | | |
|---|---|---|---|
| 2,417,741 | 3/1947 | Dillon | 285/373 |
| 3,195,206 | 7/1965 | Morriss, Jr. | 24/279 |
| 3,460,788 | 8/1969 | Goldman | 24/279 |
| 3,472,536 | 10/1969 | Ingram | 285/253 |
| 4,338,707 | 7/1982 | Byerly | 24/20 LS |
| 4,405,161 | 9/1983 | Young et al. | 285/373 |
| 4,583,770 | 4/1986 | Kreku et al. | 285/373 |
| 4,664,428 | 5/1987 | Bridges | 285/373 |
| 4,667,505 | 5/1987 | Sharp | 285/373 |
| 5,007,604 | 4/1991 | Richards | 248/74.1 |

*Primary Examiner*—Victor N. Sakran
*Attorney, Agent, or Firm*—Ellsworth R. Roston; Charles H. Schwartz

[57] ABSTRACT

A clamping assembly constructed to hold an electrical cable or tube in a fixed position includes retaining and clamping members. A first surface of the retaining member, which may be made from a compliant material, has raised and lowered portions in a particular pattern. One end of the retaining member has a face transverse to the first surface of the retaining member with raised and recessed portions defining a mating relationship with the raised and recessed portions on the first surface of the retaining member. The clamping member may be made from a springlike material and may be disposed in an open loop in an unconstrained relationship. The clamping member may be disposed in a longitudinal slot in the retaining member so as to be encased by the retaining member. The retaining member may be slitted to communicate with the slot for facilitating the disposition of the clamping member in such slot. When the clamping and retaining members are contracted to close the loop, the raised and recessed portions on the face of the retaining member mate with the raised and recessed portions on the first surface of the retaining member to hold the cable in a fixed position within the closed loop. The clamping member may be provided with detent portions at its opposite ends. The detent portions abut each other when the clamping and retaining members are contracted to close the loop. The detent portions may be retained in abutting relationship.

15 Claims, 1 Drawing Sheet

CABLE CLAMP

This invention relates to a clamp for retaining an electrical cable in a fixed position. More particularly, the invention relates to an improved clamp for retaining an electrical cable or tube in a fixed position with a significantly greater assurance of such retention than in the prior art.

Commercial and military aircraft have to be constructed with great precision. For example, different components in the aircraft have to be retained in fixed position in the aircraft so that the optional operation of the aircraft will be assured under all operating conditions that the aircraft may encounter. Two examples of this are electrical cable and tubes.

Since electrical cable and tubes are disposed throughout the aircraft, it is important to position these cables and tubes at strategic locations so that the cables and tubes will not interfere with the operation of other equipment in the aircraft. The cables are also fixedly positioned to prevent the cables and tubes from becoming displaced to positions where they can become frayed cut or damaged by mechanical members movable in the aircraft such as mechanical members having reciprocal motions. As will be appreciated, the fraying cutting or damage of cables or tubes in an aircraft can seriously impair the ability of the aircraft to maintain itself aloft or to follow a particular course.

Clamping assemblies have been provided in aircraft to retain the electrical cables and tubes in strategic locations where they will not interfere with, or be affected by, the operation of other components and sub-assemblies in the aircraft. These clamping assemblies have not always been effective in securing the cables or tubes to affixed position. Subsequent examinations of cables and tubes in aircraft have indicated that the cables and tubes have become displaced from the positions where they have been secured by the clamping assemblies. This problem has existed for some time. Attempts have been made to provide clamping assemblies which overcome this problem but such attempts have not been successful.

In one embodiment of the invention, a clamping assembly constructed to hold an electrical cable or tube in a fixed position includes retaining and clamping members. A first surface of the retaining member, which may be made from a compliant material, has raised and lowered portions in a particular pattern. One end of the retaining member has a face transverse to the first surface of the retaining member with raised and recessed portions defining a mating relationship with the raised and recessed portions on the first surface of the retaining member.

The clamping member may be made from a springlike material and may be disposed in an open loop in an unconstrained relationship. The clamping member may be disposed in a longitudinal slot in the retaining member so as to be encased by the retaining member. The retaining member may be slitted to communicate with the slot for facilitating the disposition of the clamping member in such slot.

When the clamping and retaining members are contracted to close the loop, the raised and recessed portions on the face of the retaining member mate with the raised and recessed portions on the first surface of the retaining member to hold the cable in a fixed positions within the closed loop. The clamping member ma be provided with detent portions at its opposite ends. The detent portions abut each other when the clamping and retaining members are contracted to close the loop. The detent portions may be retained in abutting relationship.

Figure 1:
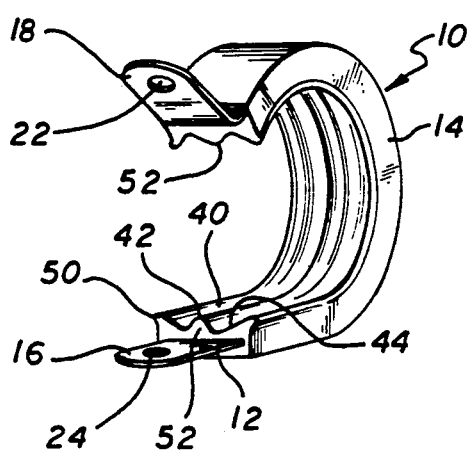
FIG. 1 is a perspective view of a prior art embodiment of a clamping assembly for an electrical cable.
Figure 4:
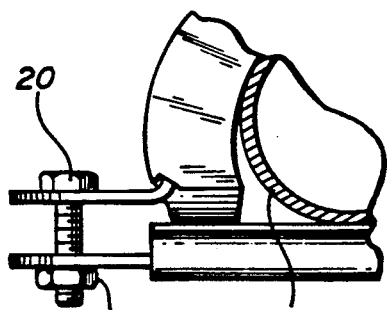
FIG. 4 is a fragmentary side elevational view of the opposite ends of the clamping assembly with the clamping assembly in the contracted position.

In the prior art embodiment shown in FIG. 1, a clamping assembly generally illustrated at 10 is shown. The clamping assembly 10 includes a clamping member 12 and a retaining member 14. The clamping member 12 may be made from a material such as a steel having springlike properties. The clamping member 12 is normally disposed in an open loop and may be provided with opposite ends 16 and 18. The end 18 may be disposed at an angle to the body of the clamping member so that, when the body of the clamping member is contracted to close the loop, the opposite ends 16 and 18 will be disposed in a parallel and abutting relationship as shown in FIG. 4. The clamping member 12 may be retained in this relationship with the open ends closed by disposing a threaded bolt 20 through holes 22 and 24 respectively in the opposite ends 16 and 18 and by threading a nut 26 on the bolt.

The retaining member 14 may be provided with a slot 30 extending longitudinally to receive the clamping member 12. The retaining member 14 may be slitted longitudinally as at 32 at an intermediate position in the lateral direction to facilitate the disposition of the clamping member in the slot 30. The retaining member 12 may be made from a compliant material such as rubber or a neoprene to grip a cable 36 disposed in the loop defined by the clamping member 12 and the retaining member 14. The retaining member 14 may be provided at its inner surface with undulations 40 defined as by a raised portion 42 and recessed portions 44. Preferably the raised portion 42 is at an intermediate position in the lateral direction and the recessed portions 44 are on opposite sides laterally of the raised portion 42. The undulations 40 are raised as at 50 at the opposite lateral ends of the retaining members 14. The retaining member 14 is provided with flat faces 52 which define the opposite ends of the retaining member 14.

When the clamping assembly 10 is contracted to close the loop and grip the cable or tube 36, the raised portions 42 and 50 at one end of the retaining member 14 contact the raised portions 42 and 50 at the other end of the retaining member. This prevents any further contraction of the clamping assembly. In the contracted position, the raised portion 42 engages the cable and material from the raised portion flows into the recessed portions 44 to enhance the gripping action by the clamping member 44 on the cable 36. It has been found, however, that this gripping action is not sufficient at times to retain the cable 36 in the closed loop now defined by the clamping assembly.

Figure 2:
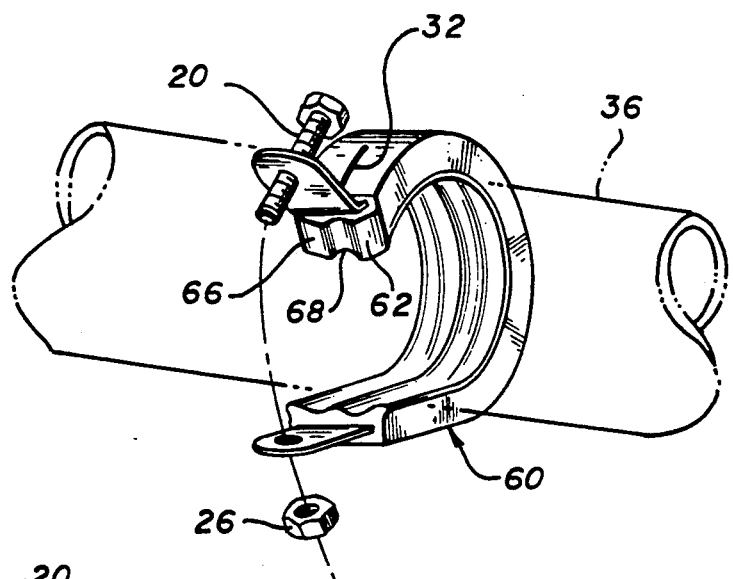
FIG. 2 is a perspective view of a clamping assembly constituting one embodiment of the invention, the perspective view being taken from a position corresponding to that shown in FIG. 1.
Figure 3:
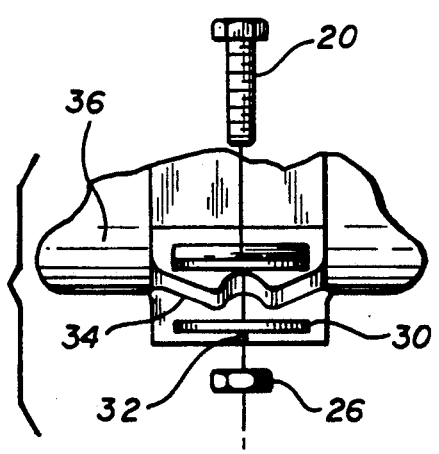
FIG. 3 is a fragmentary sectional taken substantially on the line 3—3 of FIG. 2 and illustrates the disposition of opposite ends of the clamping assembly when the clamping assembly has been contracted to hold the cable in a fixed position.

FIGS. 2-4 illustrate one embodiment of a clamping assembly generally indicated at 60, defined by this invention. The construction and operation of the clamping assembly 60 may correspond to that shown in FIG. 1 and described above except in one (1) important respect. In the embodiment shown in FIGS. 2-4, one of the faces 62 defining the end of the retaining member is provided with undulations defined by raised portions 66 and recesses 68. The raised portions 66 correspond in lateral position to the recesses 44 in the embodiment shown in FIG. 1 and the recess 68 corresponds in lateral position to the raised portion 42 in the embodiment shown in FIG. 1.

In this way, the raised and recessed portions on the face 62 mate with the recessed and raised portions on the inner surface of the retaining member 14. This provides for a greater contraction of the clamping assembly 60 in the embodiment of the invention shown in FIGS. 2-4 then in the embodiment of the prior art clamping assembly 10 shown in FIG. 1. Because of this, the clamping assembly 60 is able to grip the cable 36 with a greater force than the clamping assembly 10. This provides for a firmer retention of the cable 36 by the clamping assembly 60 than by the clamping assembly 10, thereby providing for an enhanced inhibition of the cable 36 against movement.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

We claim:

1. In combination for holding a cable or tube in a fixed position,
    a first member made from a compliant material and having a slot extending through the member, the first member having a face defining one end of the first member, the face having a particular pattern of raised and recessed portions, and
    a clamping member made from a springlike material, the clamping member being disposed in the slot in the first member and having clamping portions extending outwardly from the first member at opposite ends of the first member,
    the clamping member having a looped configuration to provide for a clamping of the opposite ends of the clamping member when the loop is closed,
    the inner surface of the first member having a particular pattern of undulations raised and recessed portions providing a mating relationship with the raised and recessed portions in the face of the first member, and
    the face of the first member providing a mating relationship with the inner surface of the first member when the clamping member is contracted to bring the clamping portions in clamping relationship for holding the cable in a fixed relationship within the loop defined by the inner surface of the first member.

2. In a combination as set forth in claim 1,
    the raised and recessed portions on the inner surface of the first member having a pattern for pressing against the cable or tube to retain the cable or tube in a fixed position within the first member with the clamping member contracted to close the loop defined by the clamping member.

3. In combination as set forth in claim 1,
    the clamping member being made from a metal having springlike properties to impart strength and rigidity to the member with the clamping member contracted to define the enclosed loop.

4. In a combination as set forth in claim 1,
    the opposite ends of the clamping member being constructed to provide for an abutting relationship of these opposite ends and to provide for a retention of the opposite ends in the abutting relationship.

5. In combination for holding a cable or tube in a fixed position,
    a retaining member made from a compliant material and having first and second opposite surfaces and having raised and recessed portions in a particular pattern on the first surface of the retaining member, the retaining member having opposite ends and having faces at the opposite ends of the retaining member in a plane transverse to the first and second opposite surfaces of the retaining member, one of the faces having raised and recessed portions shaped to define a mating relationship with the raised and recessed portions on the first surface of the retaining member when the retaining member is disposed in a closed loop with the one face abutting the first surface of the retaining member, and
    a clamping member made from a springlike material and disposed in a loop and having detent portions at its opposite ends to retain the clamping member in a closed loop when the clamping member is contacted,
    the clamping member being disposed in the retaining member to position the retaining member in a looped configuration with the first surface of the retaining member within the loop,
    the clamping member being contractible in the looped configuration to dispose the raised and lowered portions on the one face of the retaining member in a mating relationship with the raised and recessed portions on the first surface of the retaining member.

6. In a combination as set forth in claim 5,
    the raised and recessed portions extending longitudinally on the first surface of the retaining member between the opposite ends of the retaining member, at least one raised portion on the first surface of the retaining member being disposed laterally on the first surface and the first and second recessed portions on the first surface of the retaining member being disposed laterally on opposite sides of the raised portion to provide for a compression of the raised portion into the recessed portions when the clamping member is contracted in the looped configuration against the cable.

7. In a combination as set forth in claim 6,
    the retaining member being provided with a slot to receive the clamping member,
    the clamping member being constructed at its opposite ends to be retained in the contracted position defining the closed loop,
    the retaining member being slitted longitudinally to facilitate the disposition of the clamping member in the slot in the retaining member.

8. In a combination as set forth in claim 7,
    the opposite ends of the clamping member being disposed to provide an abutting relationship with the clamping member in the contracted disposition.

9. In a combination as set forth in claim 5,
the retaining member being provided with a slot to receive the clamping member,
the clamping member being constructed at its opposite ends to be retained in the contracted position defining the closed loop.

10. In combination for holding a cable in a clamped relationship,
a first member having springlike properties and disposed in an open loop and having properties of being contracted to define a closed loop, and
a second member encasing the first member and disposed in an open loop and having compliant properties and having an inner surface with an uneven configuration to become compressed against the cable when the cable is disposed within the open loop defined by the first and second members and the first and second members are contracted to close the loop defined by the second member, the second member having at one end a face with an uneven configuration to mate with the uneven configuration defined by the inner surface of the second member when the first and second members are contracted to close the open loop defined by the second member.

11. In a combination as set forth in claim 10,
the first member having at its opposite ends detent members shaped relative to each other to abut when the first and second members are contracted to close the open defined by the first member loop, the detent members being constructed to be retained in the abutting relationship.

12. In a combination as set forth in claim 10,
the uneven configuration at the inner surface of the second member being undulated to provide for a compression of such inner surface against the cable when the first and second members are contracted to close the open loops defined by the first and second members and the uneven configuration at the face at the one end of the second member being undulated to mate with the undulations in the first surface of the second member when the first and second members are contracted to close the open loop defined by the first and second members.

13. In a combination as set forth in claim 10,
the second member being provided with a longitudinal slot and the first member being encased within the slot in the second member.

14. In a combination as set forth in claim 12,
the second member having an outer surface opposite the inner surface, and
the second member being slotted longitudinally between the inner surface and the outer surface to facilitate the encasing of the first member by the second member.

15. In a combination as set forth in claim 12,
the first member having at its opposite ends detent members shaped relative to each other to abut when the first and second members are constructed to close the open loops defined by the first and second members, the first detent member being constructed to be retained with its opposite ends in the abutting relationship,
the second member being provided with a longitudinal slot and the first member being encased within the slot in the second member,
the second member being slitted longitudinally at an outer surface opposite the inner surface and the slit communicating with the slot in the second member to facilitate the encasing of the first member by the second member.

* * * * *